Figure 1:
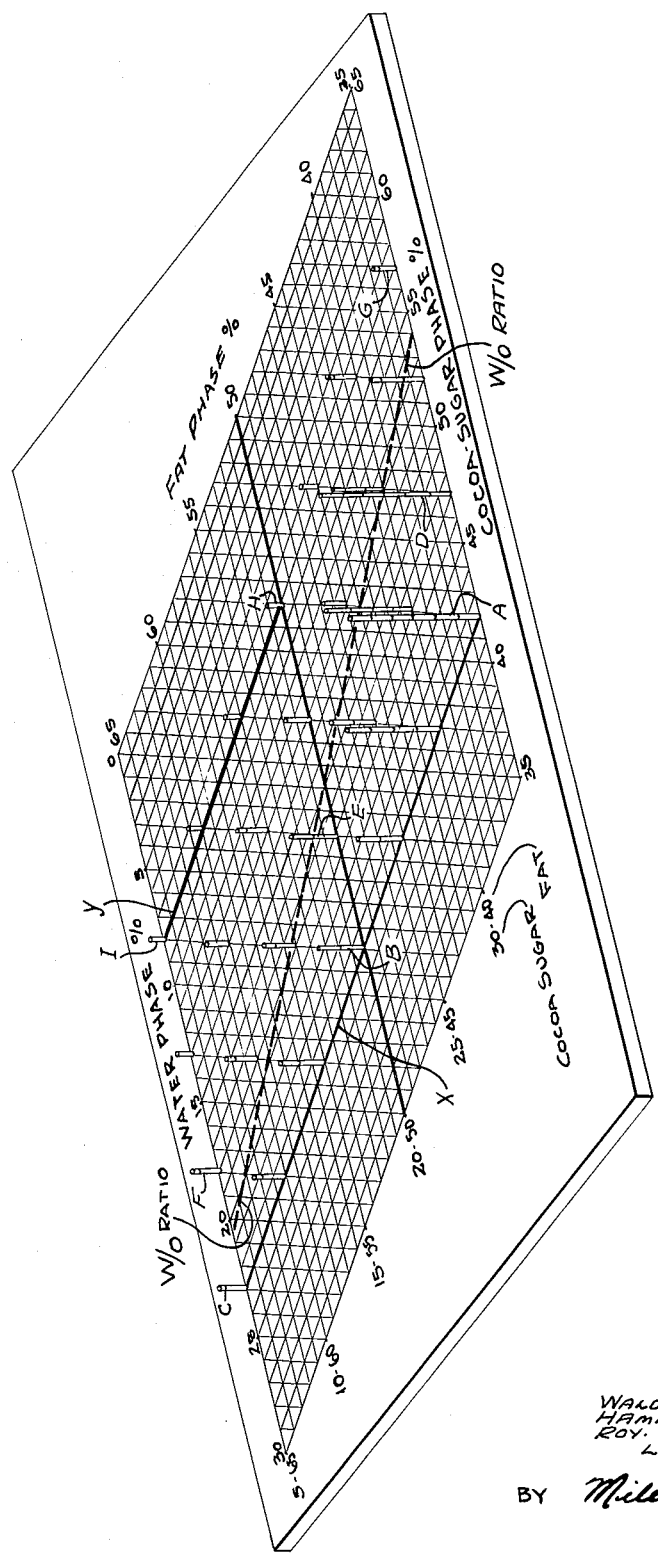

INVENTORS
WALDEMAR A. ROSENTHAL
HAMILTON A. PINKALLA
ROY F. KORFHAGE
L. RUSSELL COOK
BY Miles Kenninger
ATTORNEY

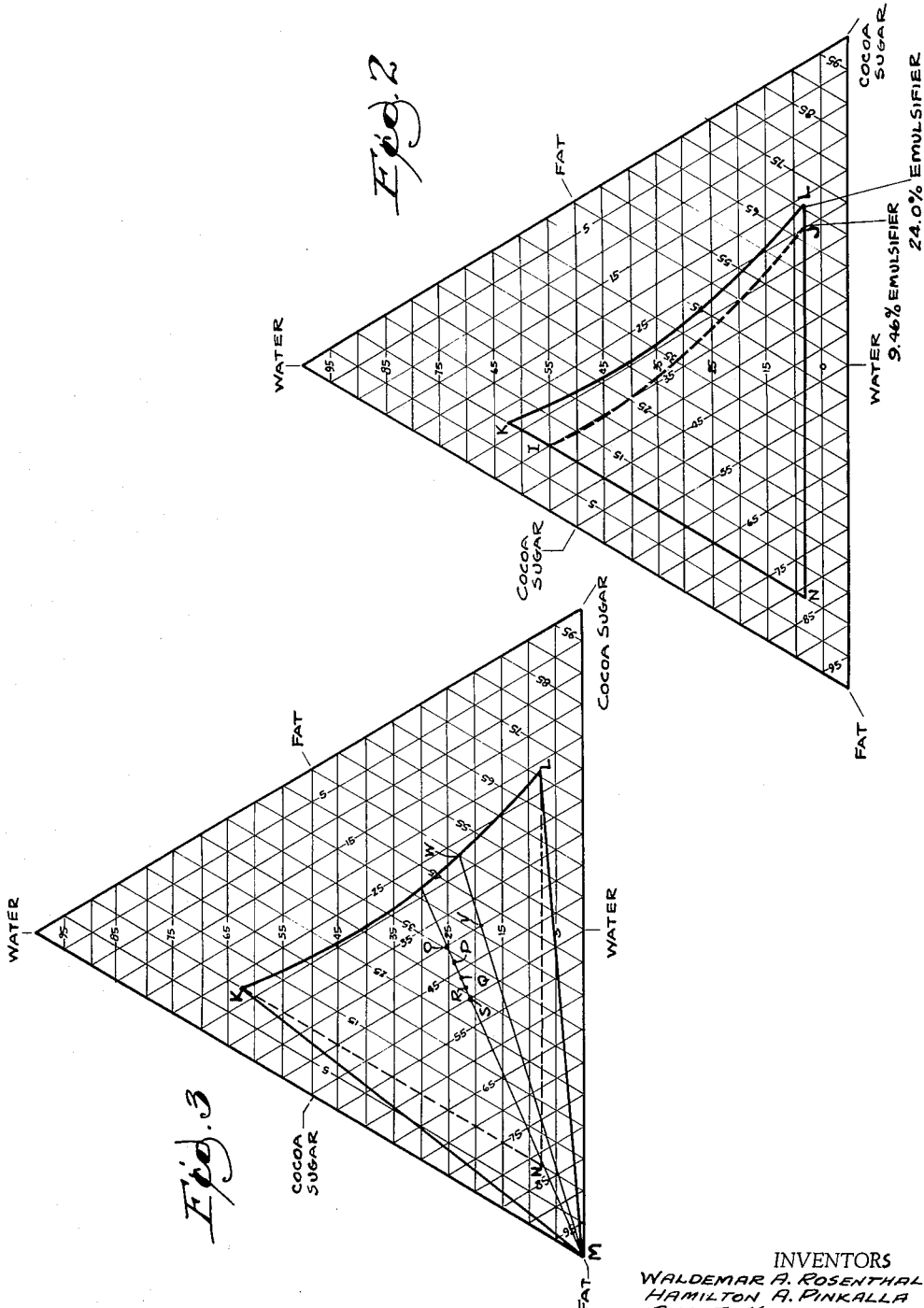

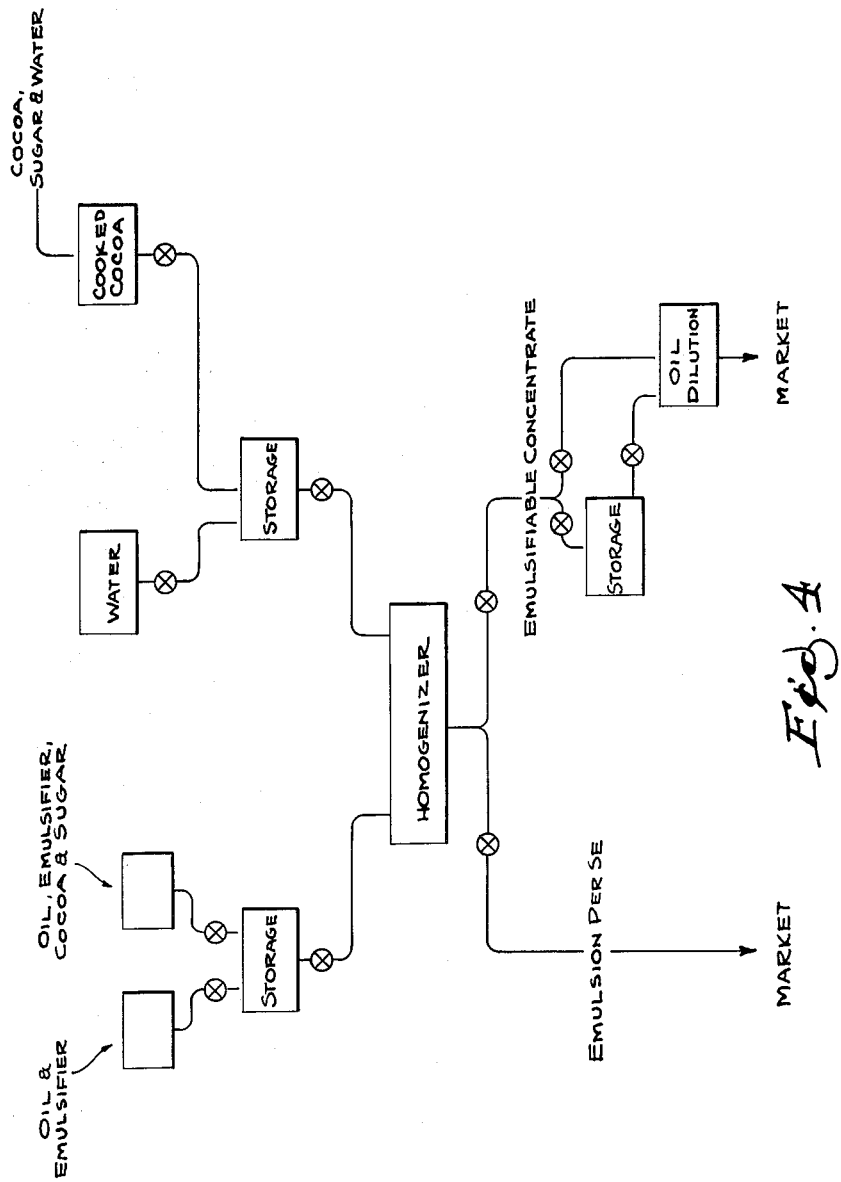

United States Patent Office 3,232,765
Patented Feb. 1, 1966

3,232,765
WATER-IN-OIL CHOCOLATE EMULSION
Waldemar A. Rosenthal, Hamilton A. Pinkalla, Leon Russell Cook, and Roy F. Korfhage, Milwaukee, Wis., assignors, by mesne assignments, to W. R. Grace & Co., New York, N.Y., a corporation of Connecticut
Filed Dec. 17, 1962, Ser. No. 245,946
12 Claims. (Cl. 99—23)

This application is a continuation-in-part of S.N. 24,959, filed April 27, 1960, now abandoned.

This invention relates to the preparation of chocolate water-in-oil emulsions and in concentrates thereof for use as foods or in connection with other foods, and to methods for making such emulsions to meet any requirements of a given food to be enrobed and to the manufacturing thereof.

Oil-in-water (O/W) chocolate emulsions have heretofore been frequently used for coating or enrobing other foods, particularly candy and cookies, and as dressings or sauces. Examples of such emulsions may be found in U.S. Patent 2,883,286 to Musser, April 21, 1959. Each use, to which such emulsions are put, requires that the materials and the physical properties of a given emulsion be adapted to the particular use. However, no chocolate water-in-oil emulsions have heretofore been put into use, nor described in the trade literature.

Each of our water-in-oil (W/O) emulsions provide physical properties which can be varied to meet the requirements for a number of particular uses. Stability or retention of W/O emulsion form is very important in use of these emulsions. In addition to stability, the viscosity and melting point of each emulsion must be adapted to its particular use. In most cases the drying or setting time of the emulsion is important, and releasability of the emulsion from a mold is sometimes important. However, extensive experience in making and handling chocolate water-in-oil emulsions is required to avoid changing or inversion of water-in-oil emulsions into oil-in-water emulsions which set into pasty fudge-like compositions, or to avoid complete breaking of the emulsion, which makes the material (no longer in emulsion state) unusable for its intended purposes. Changes in ratio of cocoa to sugar or in the proportions of cocoa-sugar mixture to fat or in type of emulsifiers used or in the amount of water or in the processing conditions, each produce changes in properties of the emulsion or in the type of emulsion or may even cause breaking the emulsion and separating into fat and water masses.

It is useful to prepare water-in-oil chocolate emulsions or chocolate emulsion concentrates to secure the advantage of intensification in flavor systems, and reduction in amount of cocoa and fat due to the amount of water added, and lower costs as compared to conventional chocolate (non-emulsion) coatings. Our concentrate may contain any desired portion of the total amount of fat but we prefer to use from one-third to two-thirds of such total fat in our concentrate, to avoid difficulties in processing. Such emulsion or its concentrates must be free from the tendency of breaking and must be capable of storage for periods of at least six months without refrigeration and without deterioration. Such emulsion or its concentrate when made with higher melting point fats, must release readily from a mold upon solidification. We have discovered the changes in materials and in the physical conditions of processing which are related in the making of chocolate emulsions with (1) a minimum of cocoa powder for a given flavor, and with (2) the desired viscosity and other physical properties for any specified use, and with (3) the possibility of varying viscosity for any particular use.

FIG. 1 of the drawing is a three-dimensional graph showing how four variables in Formulation I below may be changed to obtain a desired viscosity in a water-in-oil emulsion. Three sides of the graph respectively show the percentage of water and cocoa-sugar phase and of fat phase to be used, the scale on the fourth side being a repetition in the inner line of the percentages of the fat phase and being a repetition in the outer line of the percentages of the cocoa-sugar considered as one component or phase. The height of each peg shows the amount of non-ionic emulsifier combination used, each unit on a peg representing 2% of the total fat as emulsifier. Some pegs of the graph are severally designated A through I and the table below gives the changes in composition and viscosity for the several water-in-oil emulsions indicated by such pegs in use of Formulation I.

FIG. 2 is a triangular graph showing the percentage relationships of water, cocoa-sugar and fat in Formulation II below in dotted line and in Formulation III below in solid line, to designate the area added to Formulation II by Formulation III as a result of the use of a different amount of total emulsifier. A moderate amount of emulsifier (1–9.46% of fat) is used in Formulation II together with sufficient wax replacing some of the fat to increase density of the fatty phase and facilitate its emulsification, prevent cracking of the solidified emulsion and provide other advantages. In Formulation II, hydrophilic-lipophilic emulsifiers are used in the ratio of 86.67% lipophilic to 13.33% hydrophilic and in the total amount 9.46% of the fat whereas in Formulation III such emulsifiers are used in the total amount of 24% of the fat.

FIG. 3 is a triangular graph showing the various relations when a concentrate is diluted and shows the limits within which the proportions and relations of components may be varied without inversion of the emulsion; and FIG. 4 of the drawing is a flow sheet showing the manner in which different process may carry out the present invention.

Referring to Formulation I (see FIG. 1), we prefer water-in-oil emulsions with 23% water so that peg C is at 23 on the water phase scale and a line extends across the graph through peg B to peg A and the pegs between A and C. Other percentages of water are designated by the rows of pegs at 18%, 13% and 8% to show proportions of water we have used, the water limits of Formulation I of suitable viscosity investigated for our water-in-oil emulsions being indicated by lines X and Y. Line X on the graph shows the water content we desire, while line Y indicates a practical minimum water limit. Below 8% water content a cooked cocoa-sugar mix becomes too viscous for good distribution with presently available equipment.

A dotted line, which extends from 20.5% on the water phase scale to 54% on the cocoa-sugar phase scale, is called the W/O ratio which means that, for example, the percentage of water to fat in our emulsions is 24% to 76% which gives a ratio of .315. For W/O=.315, we can calculate the theoretical maximum amount of water usable, i.e., if O=60%, the W=18.9%. Thus water and oil will be 78.9% of our emulsion and the balance will be cocoa, sugar and emulsifier. Knowing that water and fat are theoretically balanced; the effect of the cocoa-sugar ratio can be determined in terms of both W/O ratio and emulsifiers. Hence, the W/O ratio line is a guide for determining other compounding factors in our emulsions.

The following table shows the limits for Formulation I, and the percentages of various batches shown on the graph at points A–I thereon and the viscosity of the emulsion at such points as measured by the 2 cm. MacMichael "bob":

FORMULATION I

The general proportions of Formulation I are as follows:

Fat, percent _____ 35–65
Cocoa-sugar, (5–100% cocoa, 95–0% sugar) ____ 12–57
Water, percent _____ 8–23
Emulsifier, percent of the fat _____ 1–12
   25–100% lipophilic, glyceryl mono-oleate (90%).
   75–0% hydrophilic, lecithin of O/W type (60%).

Note.—Percentages are by weight.

Proportions of fat, cocoa-sugar and water were varied in different batches as shown below:

| Graph point | A | B | C | D | E | F | G | H | I |
|---|---|---|---|---|---|---|---|---|---|
| Batch No. | 32 | 8 | 38 | 39 | 42 | 45 | 53 | 56 | 59 |
| Fat, percent | 35 | 50 | 65 | 35 | 50 | 65 | 35 | 50 | 65 |
| Cocoa-sugar, percent (25% cocoa—75% sugar) | 42 | 27 | 12 | 47 | 32 | 17 | 57 | 42 | 27 |
| Water, percent added | 23 | 23 | 23 | 18 | 18 | 18 | 8 | 8 | 8 |
| Viscosity | 250 | 18 | 9 | 162 | 15 | 8 | 15 | 4 | 3 |

Note.—The MacMichael viscosimeter has been adopted by the Chocolate Manufacturers Association and the National Confectioners Association. This measures torque on a given size wire by a given size bob immersed a given depth in a cup, driven at given r.p.m. and containing a composition of which the viscosity is to be measured, the sample being cooled to a given temperature dependent on the kind of fat used, at which time the measurement is taken.

Other formulations are given below, wherein the limits of Formulation I are extended by use of wax:

FORMULATION II

Fat, percent _____ 24.5–82.0
Cocoa-sugar, (cocoa 100–5%–sugar 0–95%)_ 10.0–67.5
Water, percent _____ 8.0–55.5
Emulsifier, percent of the fat _____ 1.0–9.46
   75–0% hydrophilic, 25–100% lipophilic.
Wax, percent of the fat _____ 1.0–10.0

FORMULATION III

Fat, percent _____ 20.5–82.0
Cocoa-sugar, percent (ratio as above) _____ 10.0–71.0
Water, percent _____ 8.0–62.5
Emulsifier, percent of the fat (as above) _____ 9.46–24.0
Wax, percent of the fat _____ 1.0–10.0

A typical formulation for production use, is as follows:

Lbs.
Cocoanut oil _____ 244.00
Cocoa _____ 37.00
Sugar _____ 91.42
Water _____ 165.80

Emulsifier:                                        Lbs.
   Glyceryl mono-oleate _____ 8.40
   Glyceryl monostearate _____ 4.00
   Acetylated tartrated glyceryl monostearate __ 2.00
Beeswax (synthetic) _____ 11.20
Salt _____ 0.50
Flavoring agents _____ 0.92
Sodium propionate (inhibitor of mold growth) __ 1.81
Sodium benzoate (bactericide) _____ 0.57

The compositions shown in Formulation I include the amount of emulsifier as shown by the scale markings on the respective pegs, the maximum amount being up to 12% of the fat. We have found that a balanced combination of hydrophilic emulsifier, such as lecithin (O/W type) and lipophilic emulsifier, such as glyceral mono-oleate is required to obtain the emulsion stability we desire and that the combined emulsifier gives best results when dissolved in the fat phase (agent in oil or "Ao" method). Other methods of emulsification frequently result in the breaking of the emulsion or in the production of a pasty fudge-like product. Other combinations of lipophilic emulsifiers such as various glyceryl mono-oleates, certain glyceryl monostearates and propylene glycol esters and hydrophilic emulsifiers such as acetylated tartrated esters of mono and diglycerides, and polyoxyethylene (20) sorbitan monostearate and oleate, may be used. In Formulations I, II and III, we can use the ratios of 25–100% to 75–0% of a lipophilic emulsifier and of a hydrophilic emulsifier respectively. In substituting emulsifiers, the amount of each emulsifier actually used is corrected based on the purity of the particular compounds in the emulsifiers listed, all of which are available on the present market.

Our emulsifier combination is chosen to yield a hydrophilic-lipophilic balance (HLB) which we have found most effective in promoting adsorption at the interface of the two immiscible liquids, namely, water and fat to yield an emulsion which will not invert or break when stored at room temperature or when remelted after storage as a solid. Such adsorption is a purely physical phenomenon as is shown from the fact that we can repeatedly solidify and remelt our emulsions without chemical change. In fact, the only chemical changes occurring are within the cocoa solids during cooking. However, we do observe such precautions as avoiding strong alkalis in the water, and other materials which are known to inhibit or prevent formation of W/O emulsions, or reduce stability, because of chemical action between fat, emulsifiers and aqueous phases. We have tabulated below various emulsifiers and their most significant properties, which will serve respectively as hydrophilic and lipophilic emulsifiers and as thinners to be used as replacements of part of the lipophilic emulsifiers.

*Table I.—Hydrophilic emulsifiers*

| Chemical name | HLB | ° F. or ° C., M.P. | Iodine value | Average purity | Trade name |
|---|---|---|---|---|---|
| Lecithin (O/W type) | | Liq. at room temp. | 90–95 | 60.0 | Centrophil S.M. |
| Polyethylene glycol 400 distearate | 7.8 | 33–38C | <5 | 90.0 | S1009. |
| Polyethylene glycol 400 mono-oleate | 11.0 | 2C | 31–40 | 100.0 | S1802. |
| Acetylated tartrated glyceride of veg. oil | 12.0 | Liq. at room temp. | 45–55 | 8.5 | Drewmulse A.T.M.G. |
| Do | 12.0 | 130F | <5 | 20.0 | TEM 4H. |
| Polyoxyethylene (20) sorbitan monostearate | 14.9 | Liq. at room temp. | <1.5 | 100.0 | Glycosperse S20. |
| Do | 14.9 | do | <1.5 | 100.0 | Tween 60. |
| Acetylated tartrated glyceryl monostearate | 15.0 | 131F | [1]3 | 30.0 | Drewmulse ATMS Spec. |
| Do | 15.0 | 136F | [1]3 | 40.0 | Gloss-Aid. |
| Do | 15.0 | Soft paste room temp. | 60 | 20.0 | TEM 4C. |
| Polyoxyethylene (20) sorbitan mono-oleate | 15.0 | Liq. at room temp. | 19–22 | 100.0 | Glycosperse 020. |

[1] Maximum.
Note.—Tested with lipophilic emulsifier, Myverol 18–71E.

*Table II.—Lipophilic emulsifiers*

| Chemical name | HLB | ° F. or ° C., M.P. | Iodine value | Average purity | Trade name |
|---|---|---|---|---|---|
| Lecithin (W/O type) | | Soft plastic at room temp. | 90–95 | 4.0 | Centrophil IP. |
| Glyceryl mono-oleate | 3.4 | 65F | 70–80 | 42.5 | S1096. |
| Glyceryl mono-oleate vegetable fat | 3.5 | 118F | 65–75 | 42.5 | GMV soft. |
| Glyceryl mono-oleate cottonseed oil | 3.5 | 110F | 80–90 | 42.5 | GMC soft. |
| Glyceryl mono-oleate cocoanut oil | 3.5 | 90F | 6–10 | 52.5 | GM-CNO. |
| Glyceryl mono-oleate peanut oil | 3.5 | 49C | 80–90 | 42.5 | GM-PNO. |
| Glyceryl mono-oleate | 3.5 | 68F | 80–95 | 42.5 | GMO. |
| Do | 3.5 | Liquid at room temperature. | 74–78 | 56.5 | Atmos 300. |
| Do | 3.5 | 95F | 65–70 | [1] 90 | Myverol 18-71E. |
| Glyceryl mono-oleate | } 3.8 | 102–108F | 110–120 | { [2] 18 [2] 74 | } Myverol 18-93. |
| Glyceryl mono-linoleate | | | | | |
| Glyceryl monostearate | 3.8 | 115–122F | 56–64 | 50.0 | Atmul 80. |
| Do | 3.8 | 125–127F | 54–61 | 56.0 | Atmul 122. |
| Glyceryl mono-oleate | 5.2 | 10F | 65–75 | 38.0 | S1097. |
| Propylene glycol stearate | 5.4 | 43–46C | <7 | 100.0 | Aldo 25. |

[1] Minimum. [2] Percent.

NOTE.—Tested with hydrophilic emulsifier, Drewmulse ATMS Spec.

*Table III.—Lipophilic thinners*

[Not useful as primary emulsifiers]

| Chemical name | HLB | ° F. or ° C., M.P. | Iodine value | Average purity | Trade name |
|---|---|---|---|---|---|
| Glyceryl mono-oleate | 3.5 | 135–142F | <2 | 54.0 | Atmos 150. |
| Glyceryl monostearate | 3.6 | 134.6–141.8F | <5 | 42.5 | Aldo 33. |
| Do | 3.8 | 138–142F | [1] 8 | 42.0 | Atmul 84K. |
| Do | 3.8 | 140F | [1] 3 | 42.5 | GMS-V-hard. |
| Do | 3.8 | 140F | [1] 3 | 27.5 | GMS-V-hard. SE. |
| Glyceryl lactopalmitate | 4.0 | 140F | [1] 2 | 12.0 | GLP-12. |
| Glyceryl lactostearate | 4.0 | 140F | [1] 2 | 12.0 | GLS-12. |
| Do | 4.0 | 140F | [1] 5 | 12.0 | SL 101. |
| Sorbitan monostearate | 4.7 | 122F | <2½ | 100.0 | Glycomul S. |
| Do | 4.7 | 122F | <5 | 100.0 | Span 60. |
| Glyceryl monostearate | 5.8 | 132.8–141.8F | 5 | 39.0 | Aldo 28. |

[1] Maximum.

NOTE.—Tested with hydrophilic emulsifier, Drewmulse ATMS Spec. and lipophilic emulsifier, Myverol 18-71E.

It will be seen that, even though the above tables each include compounds having the same chemical name, the compounds are not chemically the same due to the different sources from which they are derived and different processes of manufacture. All hydrophilic emulsifiers in Table I have a hydrophilic-lipophilic balance (HLB) of 7.8 or more while the lipophilics in Tables II and III have a hydrophilic-lipophilic balance of 5.8 or less, and that the iodine values for compounds of the same name vary widely. Referring to Tables II and III, most monoglycerides of iodine value over 40 or mixtures of such compounds, may be employed as prime lipophilic emulsifiers in producing W/O emulsions while nearly all saturated monoglycerides of iodine values of less than 8 are useful only as thinners and cannot be used as primary emulsifiers. We have found that we may replace up to 30% of the lipophilic W/O forming emulsifiers of Table II by the lipophilic thinners of Table III (hereinafter called thinners to distinguish from the prime emulsifiers) to reduce viscosity of our water-in-oil chocolate emulsions and to avoid sticking of the emulsion in the user's mouth.

The fats used, in part, determine the physical properties of the emulsion and hence the use to which each emulsion is suited. Thus choice of the fats in part determines the viscosity of the emulsion, the coverage of other foods at a given temperature, the hardness of the covering and the flavor of the covering. At present, we prefer vegetable fats such as lauric acid fats, fractionated, hydrogenated or rearranged lauric acid fats such as cocoanut and palm kernel oils, or non-lauric acid fats such as cottonseed or soya oil, etc. which may also be fractionated, hydrogenated or rearranged, or cocoa butter.

We have used hydrogenated, rearranged palm kernel oils in the formulation given below:

| | Percent |
|---|---|
| Fat | 35 |
| Cocoa-sugar | 35 |
| Water | 30 |

*Table IV*

[Viscosity (2 cm. bob at 120° F.)]

| Oil | ° F., M.P. | Emulsifier,[1] 9.46% | Replacement of fat, 24% |
|---|---|---|---|
| A | 94–96 | 45 | 90 |
| B | 101–103 | 68 | 148 |
| C | 107–109 | 80 | 162 |
| D | 111–115 | 95 | 180 |

[1] 13.33% hydrophilic to 86.67% lipophilic.

The comparative values given above show that the level of emulsifier used very substantially affects the viscosity. We have also found that phase-volume relationships and methods of preparation affect viscosity as will be apparent hereinafter.

The cocoa-sugar phase may vary in itself by as much as 100–5% cocoa or chocolate liquor and 0–95% sugar, the proportions of sugar and cocoa depending on the flavor desired and on whether or not flavor intensifiers are used. For the purposes of this application, cocoa and chocolate liquor are equivalents and may be used interchangeably or in combination.

Type Formulations II and III above include a wax to:

Facilitate emulsification,
Reduce cracking of chocolate $W/O$ emulsions upon solidification,
Reduce or avoid oil separation at the surface upon solidification.

We believe that the wax makes the fats jelly-like and increases the density of the fat phase to produce the above results. We prefer to use beeswax in the amount of 7.1% of the amount of the fat used and as replacement of that quantity of fat. However, any edible animal or vegetable wax is equivalent of beeswax and may be used in the range of 1–10% of the fat.

As used herein, a "concentrate" is any formulation to which additional fat is to be added for a particular use (a given viscosity). Manufacture of our emulsion as a concentrate with a low quantity of fat has the important advantage of greater output of water-in-oil emulsion from given equipment than when the emulsion is made directly as a diluate for final use. In a specific concentrate, the volume of materials handled depends directly on the percent of fat used, and the same concentrate may be diluted with additional fat to various values without inversion to an $O/W$ emulsion or detrimentally affecting stability of the diluate. Thus a given concentrate diluted by addition of 5, 10, 15 and 20 gms. of fat to a 100 gm. sample of concentrate gives the following percent changes:

*Gms. added fat—FIG. 3*

| Added fat | | 5 | 10 | 15 | 20 |
|---|---|---|---|---|---|
| Points | O | P | Q | R | S |
| Fat, percent | 40 | 42.9 | 45.5 | 47.8 | 50.0 |
| Water, percent | 25 | 23.8 | 22.7 | 21.7 | 20.8 |
| Cocoa-sugar, percent | 35 | 33.3 | 31.8 | 30.5 | 29.5 |

Concentrates can be made at various points within the area KLN of FIG. 3, the line KL indicating the minimum amount of fat which may be used in making concentrates within the range of proportions given in Formulation III. For example, if a concentrate is made having the proportions indicated at point O, namely,

| | Percent |
|---|---|
| Fat | 40 |
| Cocoa-sugar | 35 |
| Water | 25 | diluates can be made by adding fat in the amounts of 5, 10, 15 and 20% of total concentrate to secure the proportions indicated at points P, Q, R and S. Such points define a straight line and any dilution can be made along such line which passes through point M. Because line KL indicates the minimum of fat for formulations in the area KLN, a concentrate is obtainable at any point of intersection of a straight line from the point M through line KL, and any emulsion taken along such line and within the area KLM (to approximately M where fat is 100%) is a diluate of the concentrate (at the intersection of such line with line KL). However, we have found that a concentrate having less than approximately one-third of the fat required according to line KL, will often invert into an $O/W$ emulsion. Because the maximum fat for our emulsion is 82% (which is at point N of FIG. 3) only those diluates lying within the area KLN are practical. Accordingly it will be seen that we can make concentrates with fat content as low as 20.5% and each concentrate will have a series of diluates within the area KMLN.

Any formulation within the area KLN in FIG. 3 will yield a stable $W/O$ emulsion capable of dilution by addition of fat. Assuming that we wish a finished formulation at point V of FIG. 3, of 40% fat
19% water
41% cocoa-sugar we draw a line from point M through point V to intersection line KL. Hence the most concentrated form at point W will have the proportions of 27% fat
23% water
50% coca-sugar; and hence only 32.5% of fat can be omitted in preparing the above concentrate.

The various minimum fat compositions for Formulation II with 9.46% of emulsifier (of the total fat) lie along line IJ (see FIG. 2) and for Formulation III with 24% of the emulsifier (of the total fat), lie along line KL. Maximum fat being 82% (which is at the point N), the area for Formulation II is IJN and for Formulation III is KLN of FIG. 3. Increase in emulsifier from 9.46% to 24% adds only the very limited area IKLJ to our $W/O$ emulsions. Some special purposes may require formulations in such limited area, but such formulations should be avoided if possible, as the use of more than 9.46% adds substantially to the costs of our emulsions without materially increasing the range of proportions possible.

Generally, in processing, we prefer to blend the cocoa or chocolate liquor, sugar, water and any optional preservatives and flavors. The blend of cocoa-sugar is then heated, with stirring, from two to forty-five minutes at 160–225° F., but lower and higher temperatures may be used. For example, fudge-type flavor can be obtained by heating to about 240° F. In the meantime the fat is melted and the emulsifier is added thereto (Ao method). Where wax is included in the formulation, the wax is also melted with the fat; the phrases fatty phase blend, or fat-emulsified blend, and the like, are then to be construed as including the wax and any other components added to such blend. The cooked cocoa-sugar is now cooled to a temperature at which it has sufficient fluidity for emulsification with the fat, above the melting point of the fat used, and is then added to the fat-emulsifier combination.

The rate of addition of the cooked cocoa to the fat-emulsifier combination is adjusted to the type of mixer, the mixer speed and the total charge weight to secure thorough mixing of each increment of the cocoa-sugar mixture, in the fat-emulsifier combination as it is added. We find that addition of the cooked cocoa-sugar to the fat-emulsifier combination produces stable $W/O$ emulsions. These emulsions are dependent on batch size, type of mixer and speed, and time of agitation.

We may also omit the step of cooking the cocoa and sugar in the water used and may mix the cocoa and sugar directly with the fat-emulsifier. The speed of the mixing is then adjusted, depending on the liquidity of the fat and the viscosity (globule size) required of the final product. After homogeneous mixing of the cocoa-sugar with the fat-emulsifier, the water is added in increments over the same time and at the same mixer speeds as used above. However, we do not now obtain the intensity or kind of flavor as when the cocoa and sugar are cooked.

More specifically, we prefer to process as follows: The water, cocoa-sugar and optional components such as salt, mold and bacteria inhibitors are blended and heated with steam to 214° F. for 30 minutes. The flavoring agents are then added and the mixture is cooled to 125° F. in a kettle with a scraping agitator operated constantly at about 38 r.p.m.

The fat, emulsifiers and beeswax (fatty phase) are heated to 180° F. After the above temperature has been reached, the fatty phase is cycled through an in-the-line homogenizer operated at 3600 r.p.m. for 20 minutes and is cooled to 120° F. while recycling. The aqueous phase (cooked cocoa-sugar, etc.) is then added to the fatty phase by way of a proportioning pump, over a time of 30 minutes while the homogenizer operates at 3600 r.p.m. The emulsion is then recycled through the homogenizer for an additional 30 minutes to assure uniform dispersion of the aqueous phase in the fatty phase. The emulsion is then transferred to a pot with a scraping agitator operating at about 27 r.p.m. where the emulsion is cooled to 85° F. for packaging.

Upon dilution, if we add the fat to the concentrate, we find that the viscosity tends to be variable. Hence we add the concentrate to the fat so that a stable viscosity is obtained which allows the product to be cooled and reheated to its original viscosity. Further, adding the fat to the concentrate requires more beating and the final product is not as stable as when concentrate is added to the fat. In production, a continuous homogenizer can be used and the time for the addition of the aqueous phase to the fatty phase will then be dependent on the efficiency of the machine.

The present emulsion provides a number of advantages to food manufacturers or to the consumers, other than those already mentioned. Manufacture of our W/O emulsion requires only kettles, tanks and homogenizers which have a lower initial cost and lower maintenance than the equipment required in making traditional chocolate coatings. We eliminate the use of a mixer, refining mills and work-out kettles and the process steps involving that equipment and therefore have a much shorter process. Less cocoa, sugar and fat and less flavorings are required in our composition than in the traditional fat-based coatings so that both the costs and selling price of our product are lower. Lower fat and sugar content than in the known coatings reduces the caloric content of a given amount of coating without affecting the appearance but improving the flavor.

We produce an appreciably smoother and more uniform texture with our chocolate water-in-oil emulsions, than the conventional chocolate (non-aqueous) coatings used heretofore because all of the sugar is dissolved in water, and the cooked cocoa solids are softened, whereas the conventional non-aqueous, fat-based coatings retain all of the sugar in crystalline form and both the sugar and cocoa solids are simply ground without affecting the hardness of the particles. The flavor is improved and intensified by cooking the cocoa solids and by the use of less oil than previously used in fat-based coatings. The fat in our W/O emulsion is apparently present as a thin coating on the dispersed globules of cocoa solids, sugar, etc., so that the fat melts readily in the mouth with less sensation of "waxiness" and only a desirable "chocolate" after-taste. The present coating is less brittle on an ice cream bar than prior coatings and hence there is less tendency for the coating, to break and peel off with the usual soiling of hands and clothing. The higher water and lower fat content of our emulsion are less satiating than the traditional fat-based coatings. Also the flavor of the coatings is more apparent and is more appreciated than in the traditional fat-based coatings.

The known non-emulsified fat-based ice cream bar coatings heretofore used may melt in the pails or drums during storage and the cocoa-sugar settles toward the bottom. Such settled material requires much agitation to resuspend for use. Our emulsion may separate during storage but ordinary stirring reforms the emulsion.

We claim:

1. An edible, stable, water-in-oil chocolate emulsion retaining substantially its predetermined viscosity when used for dip coating water-containing foods such as ice cream and consisting by weight of 35.0–65.0% fat, 12.0–57.0% cocoa-sugar in ratio of 100–5% cocoa to 0–95% sugar, 8.0–23.0% of water, and non-ionic emulsifier in the amount of 1–24% based on the total fat and in the ratio of 25–100% of lipophilic to 75–0% of hydrophilic emulsifiers, the lipophilic emulsifiers having an HLB of not more than 5.8 and the hydrophilic emulsifiers having an HLB of not less than 7.8.

2. An edible, stable, water-in-oil chocolate emulsion consisting by weight of 35.0–65.0% vegetable fat, 12.0–57.0% cocoa-sugar in ratio of 100–5% cocoa to 0–95% sugar, 8.0–23.0% of water and edible non-ionic emulsifier in the amount of 1–24% based on the total fat and in the ratio of 25–100% of lipophilic to 75–0% of hydrophilic emulsifiers, the lipophilic emulsifiers having an HLB of not more than 5.8 and the hydrophilic emulsifiers having an HLB of not less than 7.8.

3. An edible, stable, water-in-oil chocolate emulsion retaining substantially its predetermined viscosity when used for dip coating water-containing foods such as ice cream and consisting by weight of 35.0–65.0% of fats of the group consisting of cocoanut, palm kernel, soya bean and cottonseed oils and cocoa butter, 12.0–57.0% cocoa-sugar in ratio of 100–5% cocoa to 0–95% sugar, 8.0–23.0% of water, and non-ionic emulsifier in the amount of 1–24% based on the total fat and in the ratio of 25–100% of lipophilic to 75–0% of hydrophilic emulsifiers, the lipophilic emulsifiers having an HLB of not more than 5.8 and the hydrophilic emulsifiers having an HLB of not less than 7.8.

4. An edible, stable, water-in-oil chocolate emulsion retaining substantially its predetermined viscosity when used for dip coating water-containing foods such as ice cream and consisting by weight of 35.0–65.0% fat, 12.0–57.0% cocoa-sugar in ratio of 100–5% cocoa to 0–95% sugar, 8.0–23.0% of water, and emulsifier in the amount of 1–24% based on the total fat and in ratio of 25–100% of lipophilic to 75–0% of hydrophilic emulsifiers, the lipophilic emulsifier being of the group consisting of glyceryl mono-oleate and monostearate, propylene glycol stearate and lecithin of W/O type and the hydrophilic compounds being of the group consisting of acetylated tartrated esters of glycerides, polyethylene glycol mono-oleate and distearate, polyoxyethylene sorbitan mono-oleate and mono-stearate and lecithin of O/W type.

5. An edible, stable, water-in-oil chocolate emulsion retaining substantially its predetermined viscosity when used for dip coating water-containing foods such as ice cream and consisting by weight of 35.0–65.0% fat, 12.0–57.0% cocoa-sugar in ratio of 100–5% cocoa to 0–95% sugar, 8.0–23.0% of water, and edible emulsifier in the amount of 1–24% based on the total fat and in ratio of 25–100% of lipophilic to 75–0% of hydrophilic emulsifiers, the lipophilic emulsifier being of the group consisting of glyceryl mono-oleate and monostearate, propylene glycol stearate and lecithin of W/O type and having an HLB of 5.4 and lower and the hydrophilic compounds being of the group consisting of acetylated tartrated esters of glycerides, polyethylene glycol mono-oleate and distearate, polyoxyethylene sorbitan mono-oleate and monostearate and lecithin of O/W type and having an HLB of 7.8 and higher.

6. An edible, stable, water-in-oil chocolate emulsion retaining substantially its predetermined viscosity when used for dip coating water-containing foods such as ice cream and consisting by weight of 20.5–82.0% fat, 10.0–71.0% cocoa-sugar in ratio of 100–5% cocoa to 0–95% sugar, 8.0–62.5% of water, edible non-ionic emulsifier in the amount of 1–24% based on the total fat and in the ratio of 25–100% of lipophilic emulsifier to 75–0% of hydrophilic emulsifiers, and wax replacing up to 10% of the fat, the lipophilic emulsifiers having an HLB of not more than 5.8 and the hydrophilic emulsifiers having an HLB of not less than 7.8.

7. An edible, stable, water-in-oil chocolate emulsion retaining substantially its predetermined viscosity when used for dip coating water-containing foods such as ice cream and consisting by weight of 20.5–82.0% fat, 10.0–

71.0% cocoa-sugar in ratio of 100–5% cocoa to 0–95% sugar, 8.0–62.5% of water, edible non-ionic emulsifier in the amount of 1–24% based on the total fat and in the ratio of 25–100% of lipophilic emulsifier to 75–0% of hydrophilic emulsifiers, and wax of the group consisting of animal and vegetable waxes and replacing up to 10% of the fat, the lipophilic emulsifiers having an HLB of not more than 5.8 and the hydrophilic emulsifiers having an HLB of not less than 7.8.

8. An edible, stable, water-in-oil chocolate emulsion retaining substantially its predetermined viscosity when used for dip coating water-containing foods such as ice cream and consisting by weight of 20.5–82.0% fat, 10.0–71.0% cocoa-sugar in ratio 100–5% cocoa to 0–95% sugar, 8.0–62.5% of water, emulsifier in the amount of 1–24% based on the total fat and in the ratio of 25–100% of lipophilic emulsifier to 75–0% of hydrophilic emulsifiers, the lipophilic emulsifier being of the group consisting of glyceryl mono-oleate and monostearate, propylene glycol stearate and lecithin of W/O type and the hydrophilic emulsifiers being of the group consisting of acetylated tartrated esters of glycerides, polyethylene glycol mono-oleate and distearate, polyoxyethylene sorbitan mono-oleate and monostearate and lecithin of O/W type, and a wax of the group of animal and vegetable waxes replacing up to 10% of the fat.

9. An edible, stable, water-in-oil chocolate emulsion retaining substantially its predetermined viscosity when used for dip coating water-containing foods such as ice cream and consisting by weight of 20.5–82.0% fat, 10.0–71.0% cocoa-sugar in ratio of 100–5% cocoa to 0–95% sugar, 8.0–62.5% of water, emulsifier in the amount of 1–24% based on the total fat and in the ratio of 25–100% of lipophilic emulsifier to 75–0% of hydrophilic emulsifiers, the lipophilic emulsifier being of the group consisting of glyceryl mono-oleate and monostearate, propylene glycol stearate and lecithin of W/O type and having an HLB of 5.4 and lower and the hydrophilic emulsifier being of the group consisting of acetylated tartrated esters of glycerides, polyethylene glycol mono-oleate and distearate, polyoxyethylene sorbitan mono-oleate and monostearate and lecithin of O/W type and having an HLB of 7.8 and higher and wax replacing up to 10% of the fat, the wax being of the group consisting of animal and vegetable waxes.

10. An edible, stable, water-in-oil chocolate emulsion retaining substantially its predetermined viscosity when used for dip coating water-containing foods such as ice cream and consisting by weight of 20.5–82.0% fat, 10.0–71.0% cocoa-sugar in ratio of 100–5% cocoa to 0–95% sugar, 8.0–62.5% of water, non-ionic emulsifier in the amount of 1–24% based on the total fat and in the ratio of 25–100% of lipophilic emulsifier to 75–0% of hydrophilic emulsifiers, the lipophilic emulsifiers having an HLB of not more than 5.4 and the hydrophilic emulsifiers having an HLB of not less than 7.8, wax replacing up to 10% of the fat, and a non-ionic lipophilic thinner and having an HLB below 5.8 and replacing up to 30% of the lipophilic emulsifier.

11. An edible, stable, water-in-oil chocolate emulsion retaining substantially its predetermined viscosity when used for dip coating water-containing foods such as ice cream and consisting by weight of 20.5–82.0% fat, 10.0–71.0% cocoa-sugar in ratio of 100–5% cocoa to 0–95% sugar, 8.0–62.5% of water, emulsifier in the amount of 1–24% based on the total fat and in the ratio of 25–100% of lipophilic emulsifier to 75–0% of hydrophilic emulsifiers, the lipophilic emulsifier being of the group consisting of glyceryl mono-oleate and monostearate, propylene glycol stearate and lecithin of W/O type and having an HLB of 5.4 and lower and the hydrophilic emulsifiers being of the group consisting of acetylated tartrated esters of glycerides, polyethylene glycol mono-oleate and distearate, polyoxyethylene sorbitan mono-oleate and monostearate and lecithin of O/W type and having an HLB of 7.8 and higher, wax replacing up to 10% of the fat, and a thinner for replacing up to 30% of the lipophilic emulsifier, the thinner being a lipophilic emulsifier having an HLB below 5.8.

12. An edible, stable, water-in-oil chocolate emulsion retaining substantially its predetermined viscosity when used for dip coating water-containing foods such as ice cream and consisting by weight of 20.5–82.0% fat, 10.0–71.0% cocoa-sugar in ratio of 100–5% cocoa to 0–95% sugar, 8.0–62.5% of water, emulsifier in the amount of 1–24% based on the total fat and in the ratio of 25–100% of lipophilic emulsifier to 75–0% of hydrophilic emulsifiers, the lipophilic emulsifier being of the group consisting of glyceryl mono-oleate and monostearate, propylene glycol stearate and lecithin of W/O type and having an HLB of 5.4 and lower and the hydrophilic emulsifiers being of the group consisting of acetylated tartrated esters of glycerides, polyethylene glycol mono-oleate and distearate, polyoxyethylene sorbitan mono-oleate and monostearate and lecithin of O/W type and having an HLB of 7.8 and higher, wax replacing up to 10% of the fat, the wax being of the group consisting of animal and vegetable waxes, and a lipophilic thinner having an HLB below 5.8 and replacing up to 30% of the lipophilic emulsifier.

References Cited by the Examiner

UNITED STATES PATENTS

| | | | |
|---|---|---|---|
| 2,025,985 | 12/1935 | Harris | 99—23 XR |
| 2,287,838 | 6/1942 | Stanley | 99—23 |
| 2,539,518 | 1/1951 | Mayberry | 99—23 |
| 2,586,615 | 2/1952 | Gross | 99—23 |
| 2,785,978 | 3/1957 | Gracht | 99—23 |

FOREIGN PATENTS 805,353   12/1958   Great Britain.

OTHER REFERENCES

"Atlas Surface Active Agents," Publ. by Atlas Powder Co., 1948, page 19 relied on.

The American Perfumer, May 1955, pp. 26–29.

A. LOUIS MONACELL, *Primary Examiner.*